United States Patent Office 2,713,033
Patented July 12, 1955

2,713,033

ACIDIZING OIL-BEARING FORMATIONS

Paul H. Cardwell and Albert W. Coulter, Jr., Tulsa, Okla., assignors to The Dow Chemical Company, Midland, Mich., a corporation of Delaware No Drawing. Application September 15, 1952,
Serial No. 309,738

8 Claims. (Cl. 252—8.55)

The invention relates to the acid treatment of oil-bearing earth formations, such as those penetrated by the bore of a well through which oil is recovered. It more particularly concerns an improved method of facilitating the flow of oil from an oil-bearing earth formation to a well therein.

In the usual method of acidizing an earth formation penetrated by a well bore, a quantity of aqueous hydrochloric acid solution is used. The acid solution usually has a concentration of about 15 per cent of HCl by weight, although other concentrations may be used, such as those between about 3 and 25 per cent. Small amounts of one or more additives are usually also used in the acid solution, such as a corrosion inhibitor, a surface tension lowering agent, a soluble fluoride, and a penetrating agent according to circumstances. The acid solution is introduced into the well and allowed to permeate the earth formation through which the oil reaches the well. Usually a considerable pressure is applied to the acid solution, as by pumping, so as to force the acid solution to enter the earth and a chaser of oil introduced behind the acid solution sends it far beyond the confines of the well hole. One of the functions of the acid is to dissolve the acid-soluble matter in the earth formation and thereby create new flow channels and enlarge existing ones thus enabling oil in the formation to more easily reach the well.

A number of disadvantages inure to such practice which limits its usefulness. One of these disadvantages is that the acid solution in attacking the earth formation usually comes into contact with clay particles or other fine silicate particles and causes them to swell. The resulting swelled particles more or less defeat the purpose of the acidizing operation in that they tend to obstruct the flow of oil to the well after the acidizing operation is completed. Another disadvantage is that the surface of the earth particles after being in contact with the acidizing solution are left in the hydrophilic condition. In this condition particles loosened from the earth formation by the acidizing solution tend to flow into and cause clogging of the oil flow channels leading to the well. Another disadvantage is that relatively permanent emulsions tend to form with the spent acid. It is a desideratum in the art of acidizing formations to overcome these disadvantages.

It has now been discovered that by including in the acidizing solution which is injected into the oil-bearing earth formation a tetraalkyl ammonium chloride (referred to herein in brief as TAC) wherein two of the alkyl radicals are methyl radicals and the other two each contain from 8 to 14 carbon atoms, the foregoing disadvantages are substantially, if not completely, overcome. The invention then consists of the improved acidizing method herein fully described and particularly pointed out in the claims.

In carrying out the invention, a water solution containing from about 1 to 25 per cent of HCl may be used, a preferred concentration being about 15 per cent. To the acid solution is added a relatively small amount of the TAC, such as from 0.001 to 10 per cent by weight. Generally effective amounts are from 0.1 to 1 per cent by weight, a preferred amount being about 0.4 per cent. The TAC is dispersed in the acid solution as by stirring before injecting the resulting mixture or solution into the earth formations to be treated. If desired, other additives which are conventionally used in the usual acidizing operation, as already mentioned, may be included in the acid solution. The hydrochloric acid solution containing the TAC is introduced into the well and thence into the contiguous earth by the application usually of pressure, if necessary. After the acid has acted upon the earth formation, the injection pressure is released and the well is put into production, thereby allowing spent acid to return to and be withdrawn from the well.

As already indicated, a number of advantages result from the practice of the method among which may be mentioned that the earth formation is rendered organophilic, thereby aiding the flow of oil to the well. Loose earth particles released from the formation by the acidization and normally tending to block flow channels are easily lubricated out of the earth formation with the produced oil. Swelling of silicate particles is minimized. Emulsions of the oil-in-water type which are oftentimes formed in conventional acidizing, and cause difficulty in obtaining clean oil, are prevented from forming.

The effectiveness of the TAC to render an oil sand wettable by oil on being acidized is illustrated by tests conducted as follows:

The TAC in amount between 0.1 and 1 per cent by weight was dissolved in hydrochloric acid solutions of strengths of 15 to 20 per cent of HCl by weight. In each test 20 milliliters of the resulting acid solution was placed in a 2 ounce bottle together with 1 gram of white Ottawa sand passing a 60 mesh sieve. The sand and the acid solution containing the TAC were mixed together and then 10 milliliters of kerosene oil dyed red to render it more visible was added to the mixture in the bottle and the whole shaken for 15 seconds. The bottle was then allowed to stand upright allowing the sand to settle to the bottom of the bottle. Visual inspection of the settled sand revealed whether or not it was wetted by the kerosene. Wetting of the sand by the kerosene was revealed as a colored oil film carried by the sand. When no wetting of the sand by the kerosene oil occurred, this was revealed by failure of the sand to carry with it to the bottom of the bottle the kerosene oil. In each test in which the TAC was present in the hydrochloric acid solution, the kerosene oil was carried to the bottom of the bottle with the sand as a coating on the sand grains, thereby showing that the sand was rendered organophilic. When the TAC was omitted, the settled sand failed to carry with it the oil to the bottom of the bottle, thereby indicating that the sand was organophobic. A series of similar tests were also made in which after the sand was put into the bottle with the acid solution containing the TAC calcium carbonate was slowly added in amount sufficient to spend the acid. Then the dyed kerosene was added and the bottle shaken. In each instance of this test, the sand became wetted with the dyed kerosene when the TAC was present in the acid solution, thereby indicating that the sand was rendered organophilic. In the absence of the TAC the sand remained organophobic.

The effectiveness of the TAC to reduce the swelling of earth formations when present in the acid while treating an oil-bearing sand therewith is illustrated by tests conducted as follows:

15 milliliters of 15 per cent hydrochloric acid were placed in each of six 25 milliliter capacity graduated test tubes. Into three of the tubes was placed also 0.4 per cent by weight of di-dodecyl dimethyl ammonium chloride which was dissolved in the acid solution. Three samples of oil-bearing formations (two being Wanona lime and one Caddo lime), containing both acid-soluble and acid-insoluble matter, were ground until each passed through a 20 mesh standard sieve. A portion of the formations so ground was added to one of the tubes not containing the alkyl ammonium chloride and another similar portion to one of the tubes containing the alkyl ammonium chloride, the portions being sufficient to just spend the acid in each tube. Hence, each tube received the same weight of ground oil-bearing formation. After the resulting reaction between the acid and the ground portions of the earth formation had subsided in each tube, the volume of the remaining acid-insoluble matter was ascertained by the volume it occupied in the graduated test tubes. The volumes thus obtained indicated the relative amount of swelling occurring when the plain acid solution was used compared to that when the acid solution contained the alkyl ammonium chloride in accordance with the invention, as shown in the following table:

| Test No | Type of formation sample | Volume of acid insoluble matter in ML | |
|---|---|---|---|
| | | After solution in plain 15% HCl | After solution in 15% HCl+0.4% di-dodecyl dimethyl ammonium chloride |
| 1 & 2 | Wanona lime | 5.7 | 4.5 |
| 3 & 4 | Wanona lime | 4.7 | 3.9 |
| 5 & 6 | Caddo lime | 6.0 | 4.5 |

From the table, it is manifest that when the acid solution contains the alkyl ammonium chloride (di-dodecyl dimethyl ammonium chloride), in accordance with the invention, the volume of the undissolved residue is much smaller than that produced by the plain hydrochloric acid conventionally used.

To illustrate the action of the presence of the TAC in the hydrochloric acid solution in preventing emulsion difficulties which arise in conventional acidizing the following tests are cited. In these tests, batches of 25 ml. each of 15 per cent HCl solution were spent upon weighed samples of Caddo limestone by slowly adding the ground sample to 25 cc.'s of the acid in a 2-ounce bottle until the acid was just spent. An amount of limestone thus determined was added to each of two 2-ounce bottles. To one of these bottles was added 25 ml. of plain 15 per cent HCl solution. To the other bottle was added 25 ml. of 15 per cent HCl solution containing 0.3 per cent didodecyl dimethyl ammonium chloride and after the reaction which had subsided 25 ml. of kerosene was poured on the top of the spent acid in each bottle without mixing and the bottles were then set in a thermostat at 77° F. for 1 hour. The bottles and contents thus uniformly heated to 77° F. were each capped and shaken vigorously for 15 seconds to a like extent and then allowed to stand upright undisturbed. While so standing, the per cent breakout of the emulsion was observed periodically with the following results: In the bottles in which the acid contained the TAC, the emulsion was completely broken in 1 minute and remained so. In the bottles in which the plain acid was used the emulsion was but 50 per cent broken in 1 minute and about 75 per cent broken after 1 hour's standing.

As illustrative of the effect of the presence in the acid solution of the TAC on reducing the tendency for fine particles, released during acidizing, to clog the flow channels the following test is cited. In this test, two cores of an oil-bearing limestone were used. Both cores had a fluid permeability of 58 millidarcys. Two batches of a fine sand (325 mesh), which would be comparable to the fine particles released in an acidizing operation, were treated in different ways and then the resulting treated sand forced into one of the cores to determine the pore plugging action of each batch of the sand. This was accomplished by suspending the batches of treated sand in kerosene and forcing the suspensions into the cores. In one of these ways of treatment of the fine sand, which treatment would correspond to the conventional acidizing of the sand, it was mixed with 15 per cent HCl solution and then suspended in kerosene. The suspension thus obtained of acid-wetted sand in kerosene was then pumped into one of the limestone cores. This reduced the permeability of the core to 23 millidarcys as measured by forcing plain kerosene through the suspension-treated core in the same direction as that in which the suspension was forced into the core. After thus determining the permeability in the one direction, the permeability in the opposite direction was similarly determined, that is, by forcing plain kerosene through the core from the opposite end. In this determination of the permeability, some of the fine sand was dislodged from the core leaving it with a permeability of 34 millidarcys. In the other of the two ways of treatment of the fine sand, it was mixed with 15 per cent HCl containing 0.4 per cent by weight of a TAC consisting of di-dodecyl dimethyl ammonium chloride. The sand so treated was removed from the acid and suspended in kerosene, the suspension thus obtained corresponding to that which would form in an acidizing operation according to the invention. The sand-kerosene suspension thus made was then forced into the other limestone core. After the injection of this sand-kerosene suspension into the core, its permeability was measured by forcing plain kerosene through the core in the same direction. The permeability thus measured was 15 millidarcys indicating that the fine sand treated with the acid solution containing the TAC entered the core in greater amount. Then plain kerosene was forced through the so obtained sand-containing core from the opposite end so as to measure the permeability of the core in the reverse direction. In this determination, as before, some of the sand previously deposited in the core was dislodged. The permeability thus measured was 43 millidarcys, indicating that much of the deposited sand became dislodged. By comparing the permeability of the one core after treatment with the plain acid-treated sand with that of the other core after treatment with the TAC-treated sand, it is manifest that there is a reduction in the amount of pore blocking corresponding to a change of from 34 millidarcys to 43 millidarcys of permeability.

The following examples of well treatments are illustrative of the practice of the invention:

*Example 1*

The well was drilled to a depth of 5398 feet using a rotary drilling rig and a water-base drilling mud. The well was cased to bottom with 7 inch casing cemented in place and perforated with 4 shots per foot between the depths of 5314 and 5390 feet. The well was provided with 2 inch tubing to a depth of 5314 feet and a packer set at 5310 feet. On swabbing, this well produced at the rate of 24 barrels of oil per day. For treating the well in accordance with the invention, a solution of 96 barrels of 15 per cent aqueous hydrochloric acid was prepared containing 16 gallons of sodium meta-arsenite solution as a corrosion inhibitor and 12 gallons of TAC in the form of di-dodecyl dimethyl ammonium chloride. The casing was filled with crude oil by pumping crude oil into the annular space between the casing and tubing above the packer and a positive pressure of 1000 p. s. i. was applied to the oil in the casing and this pressure was maintained during the treatment of the well. Next the tubing was filled with crude oil and about 5 barrels of oil was then forced into the formation through the tubing by the application at the tubing head of 900 p. s. i. The 96 barrels of prepared hydrochloric acid solution containing the TAC was then pumped into the well through the tubing at the rate of 1.5 barrels per minute at a pressure of about 800 p. s. i. After the acid solution was thus introduced into the well, 25 barrels of oil (the volume of the tubing string) was pumped into the tubing, thereby displacing the acid solution from the tubing into the earth formation. The well was then shut in for 30 minutes and then the tubing was opened allowing the well to flow. After the spent acid and oil were flowed from the well, its flowing rate of production was 400 barrels of oil per day (without swabbing). Sixty days later the well was flowing at a rate of 200 barrels per day.

*Example 2*

This well was drilled into the same pool as that in Example 1 using water-base drilling mud and a rotary rig to a depth of 6233 feet and cased the full depth with 7 inch casing which was cemented in place. The well was plugged back to 5849 feet and the casing perforated between 5800 and 5820 feet using 4 perforations per foot. Tubing (2½ inch) was provided to a depth of 5762 feet with a packer set at 5758 feet. For treating the well in accordance with the invention, there was prepared 96 barrels of 15 per cent hydrochloric acid solution containing 16 gallons of sodium meta-arsenite solution as a corrosion inhibitor and 12 gallons of TAC in the form of di-dodecyl dimethyl ammonium chloride. The casing of the well was filled with oil and a pressure of 1000 p. s. i. was maintained on it during the treatment. The tubing string was then filled with oil (35 barrels capacity) and oil was forced into the formation at the rate of 3 barrels per minute at a pressure of 2200 p. s. i. until the pressure broke to 1900 p. s. i. at the same pumping rate until 40 barrels of oil had been pumped into the tubing. The acid solution was then pumped into the well through the tubing at the rate of 3 barrels per minute until all the acid had entered the tubing. Oil was then pumped into the tubing to displace the acid in it into the formation, 35 barrels of oil being thus used. During the injection of the acid, the pressure was substantially constant at 1700 p. s. i. The well was then shut in for 30 minutes and then the tubing head was opened to permit the well to flow. Thirty days later the well was flowing oil at the rate of 195 barrels per day (without swabbing). Prior to the treatment, the well produced about 24 barrels of oil per day on swabbing.

We claim:

1. The method of treating a well drilled into a petroleum-bearing formation which comprises introducing into the well and thence into the formation a hydrochloric acid solution containing from 1 to 25 per cent of HCl and from 0.001 to 10 per cent of a tetraalkyl ammonium halide wherein two of the alkyl radicals are methyl radicals and two of the alkyl radicals each contain from 12 to 14 carbon atoms.

2. The method according to claim 1 in which the halide is the chloride.

3. The method according to claim 1 in which the halide is di-dodecyl dimethyl ammonium chloride.

4. The method according to claim 3 in which the halide is present in the acid solution in the proportion of 0.1 to 1 per cent.

5. A well treating composition comprising an aqueous solution containing from 1 to 25 per cent of HCl and from 0.001 to 10 per cent of a tetraalkyl ammonium halide wherein two of the alkyl radicals are methyl radicals and two of the alkyl radicals each contain from 12 to 14 carbon atoms.

6. A well treating composition according to claim 5 in which the halide is the chloride.

7. A well treating composition according to claim 5 in which the halide is di-dodecyl dimethyl ammonium chloride.

8. A well treating composition according to claim 7 in which the halide is present in the acid solution in the proportion of 0.1 to 1 per cent.

References Cited in the file of this patent

UNITED STATES PATENTS

| | | |
|---|---|---|
| 2,265,759 | Lawton et al. | Dec. 9, 1941 |
| 2,331,594 | Blair | Oct. 12, 1943 |
| 2,356,205 | Blair et al. | Aug. 22, 1944 |
| 2,414,668 | Ratcliffe | Jan. 21, 1947 |
| 2,663,689 | Kingston et al. | Dec. 22, 1953 |